(12) United States Patent
Rooks, Sr. et al.

(10) Patent No.: US 8,576,877 B1
(45) Date of Patent: Nov. 5, 2013

(54) SYSTEM AND METHOD OF PROVIDING A BROADBAND DIGITAL LOOP CARRIER CABINET

(75) Inventors: Kelsyn Donel Seven Rooks, Sr., Overland Park, KS (US); Erik Geldbach, Olathe, KS (US); Mark Wilmoth, Gardner, KS (US); Shane M. Smith, Paola, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 171 days.

(21) Appl. No.: 12/057,246

(22) Filed: Mar. 27, 2008

(51) Int. Cl.
*H04J 3/16* (2006.01)
*H04L 12/66* (2006.01)

(52) U.S. Cl.
USPC .......................................... 370/468; 370/354

(58) Field of Classification Search
USPC .................................. 370/468, 354
See application file for complete search history.

(56) References Cited

U.S. PATENT DOCUMENTS

| | | | | |
|---|---|---|---|---|
| 6,246,699 B1* | 6/2001 | Wartski et al. | ................ | 370/498 |
| 7,039,073 B1* | 5/2006 | Muntz et al. | .................. | 370/539 |
| 7,349,345 B1* | 3/2008 | Hansen et al. | ................ | 370/242 |
| 7,539,298 B1* | 5/2009 | Ruble | ........................... | 379/326 |
| 2002/0191777 A1* | 12/2002 | Milbrandt et al. | ....... | 379/387.01 |
| 2006/0045077 A1* | 3/2006 | Mallya | .......................... | 370/354 |
| 2007/0147408 A1* | 6/2007 | Diaz Diaz et al. | ............ | 370/420 |
| 2008/0056278 A1* | 3/2008 | Kadambi et al. | ......... | 370/395.53 |

OTHER PUBLICATIONS

Don McCullough, Broadband Properties: For the First Mile: MSAP Delivers Metro Ethernet to Business Customers, Oct. 2005, pp. 34-37.*
Calix, Press Release: Calix Deployment of Over 500 C7 Simplified Services Platforms at 50+ Carriers Indicates Strong Demand for Cost-Effective, Simplifying, Service-enabling Solutions, Feb. 3, 2003, p. 1.*
Business Weirwea, ADTRAN Announces High-Density Central Office DSLAM; Total Access 3000 DSLAM Delivers Over 3000 Ports of ADSL,2003,Business Wire , pp. 1-2.*

* cited by examiner

*Primary Examiner* — Mark Rinehart
*Assistant Examiner* — Angel Brockman
(74) *Attorney, Agent, or Firm* — Swanson & Bratschun, L.L.C.

(57) ABSTRACT

A broadband digital loop carrier and method for distributing communications signals to customers of a service provider may include a multi-service access platform unit and line termination unit in communication with the multi-service access platform unit. In one embodiment, the line termination unit is a multiplexer. The line termination unit may be configured to operate communications equipment that operates at bandwidths that are lower than cards operating in the multi-service access platform unit.

19 Claims, 6 Drawing Sheets

SYSTEM AND METHOD OF PROVIDING A BROADBAND DIGITAL LOOP CARRIER CABINET

BACKGROUND

Telecommunications networks are formed by switches, routers, and other devices being in communication via communications or transmission media (e.g., wires, fiber optics, wireless links, etc.). In configuring a network, such as the public switched telephone network (PSTN), telecommunications service providers utilize hardware produced by hardware vendors. The hardware has evolved over the years to accommodate new forms of communication, including facsimile, email, digital telephone, mobile telephone, and other Internet and non-Internet applications. As technology and applications have advanced, demand for communications has significantly increased to accommodate the applications, such as video and music distribution.

FIG. 1A is an illustration of an exemplary embodiment of a telecommunications service provider network coverage area 100 that includes a central office (CO) 102 that operates to provide telecommunications services to customers. The telecommunications service provider may service customer serving areas (CSAs) 104a-104n (collectively 104) in providing telecommunications services. Over the years, two network models have developed, where a first network model is shown in customer serving area 104a. As shown, the central office 102 communicates directly or via repeaters with a residence 106. A second configuration is shown in customer serving areas 104b-104n, where the central office 102 communicates with a broadband digital loop carrier (BBDLC) 108a-108m (collectively 108), which, in turn, communicates to customers at residences 110a-110n, 112a-112n, and 114a-114n, respectively. The second configuration is generally used about 80% of the time by local telecommunications service providers and the first configuration is used about 20% of the time by the local telecommunications service providers. The reason for the second configuration being more prevalent is that significant amounts of wiring is saved by being able to use broadband digital loop carriers positioned remotely from the central office 102 in a customer serving area for servicing multiple residences.

FIG. 1B is an illustration of an exemplary network configuration 116 showing the two configurations of FIG. 1A of communications between a central office, such as central office 102, of a telecommunications service provider and residences of customers. As shown, the network configuration 116 includes a network 118, such as the PSTN, in which the central office 102 of the telecommunications service provider operates. In a first configuration, the central office 102 communicates through T1 repeater(s) 120a direct to a customer 106. In a second configuration, the central office 102 communicates via the broadband digital loop carrier 108a via T1 repeater(s) 120n to the residences 110a-110n of customers.

FIG. 1C is a block diagram of exemplary hardware within a central office bay 122 of the central office 102 (FIGS. 1A and 1B) and broadband digital loop carrier 108a. In part, the central office bay 122 includes a fuse panel (FP) 124, multi-service access platform (MSAP) unit 126, and other components, such as routing and switching components, as understood in the art. The broadband digital loop carrier 108a generally includes an MSAP unit 130 and other components 132 and 134, such as routing and switching components. The MSAP units 126 and 130 typically support different communications products and protocols for providing telecommunications and data communications services. Regional bell operating companies (RBOCs) are generally careful to support legacy customers by utilizing communications hardware, such as the MSAP units 126 and 130, with communications cards having relatively low bandwidth.

FIG. 1D is an illustration of an expanded view of the MSAP unit 130, which is essentially a backplane having slots 136a-136n (collectively 136) that are adapted to receive communications cards. The communications cards configured in the backplane of the MSAP unit 130 may be configured for a variety of different communications protocols and functionality, including high density subscriber lines (HDSLs) and T1 lines. A typical 4-port HDSL card supports 9-megabits of bandwidth and T1 card supports 18-megabits of bandwidth. As understood in the art, the slots of the MSAP unit 130 can operate at high-bandwidths, such as 10 GB. Utilizing low-bandwidth cards, such as an HDSL card operating at 9 megabits (MB), is a waste of bandwidth resources. Given that the cost of the MSAP unit 130 may range up to $100,000.00, it can become very expensive for large telecommunications companies to deploy a large number of MSAP units in the BBDLCs. However, for large telecommunications companies, these costs are easily absorbed. Smaller telecommunications companies, such as mid-size, local telecommunications companies, are less able to absorb the high cost of deploying many BBDLCs. Using low-bandwidth cards in slots of the MSAPs BBDLCs causes more BBDLCs to be deployed to service customers.

SUMMARY

To overcome the problem of large telecommunications carriers utilizing broadband digital loop carriers with low bandwidth communications cards, the principles of the present invention provide for a system and method for providing a broadband digital loop carrier that supports legacy customers by utilizing multi-service access platform units and line termination units and provides high-bandwidth equipment to minimize the number of broadband digital loop carriers needed to support a customer serving area. In one embodiment, a multi-service access platform unit having a high-bandwidth backplane may be integrated into a broadband digital loop carrier. In addition, a low-cost, line termination unit may be integrated into the broadband digital loop carrier and configured to communicate with the multi-service access platform unit, thereby enabling high-bandwidth communications cards to be operated in the slots of the backplane of the multi-service access platform unit and low-bandwidth communications cards to be operated in the line termination unit.

One embodiment of a broadband digital loop carrier for distributing communications signals to customers of a service provider may include a multi-service access platform unit and a line termination unit in communication with the multi-service access platform unit. In one embodiment, the line termination unit is a multiplexer. The line termination unit may be configured to operate communications equipment that operates at bandwidths that are lower than cards operating in the multi-service access platform unit.

One embodiment of a process for providing communications to customers of a communications service provider may include receiving communications signals from a network at a broadband digital loop carrier. The communications signals may be processed by the broadband digital loop carrier. The broadband digital loop carrier may communicate with a customer via a line termination unit.

One embodiment of a process of configuring a broadband digital loop carrier may include providing a cabinet configured to house communications equipment. A multi-service access platform unit may be configured in the cabinet. A line termination unit may be configured in the cabinet. The line termination unit may be in communication with customer premises equipment and the multi-service access platform unit

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1A:
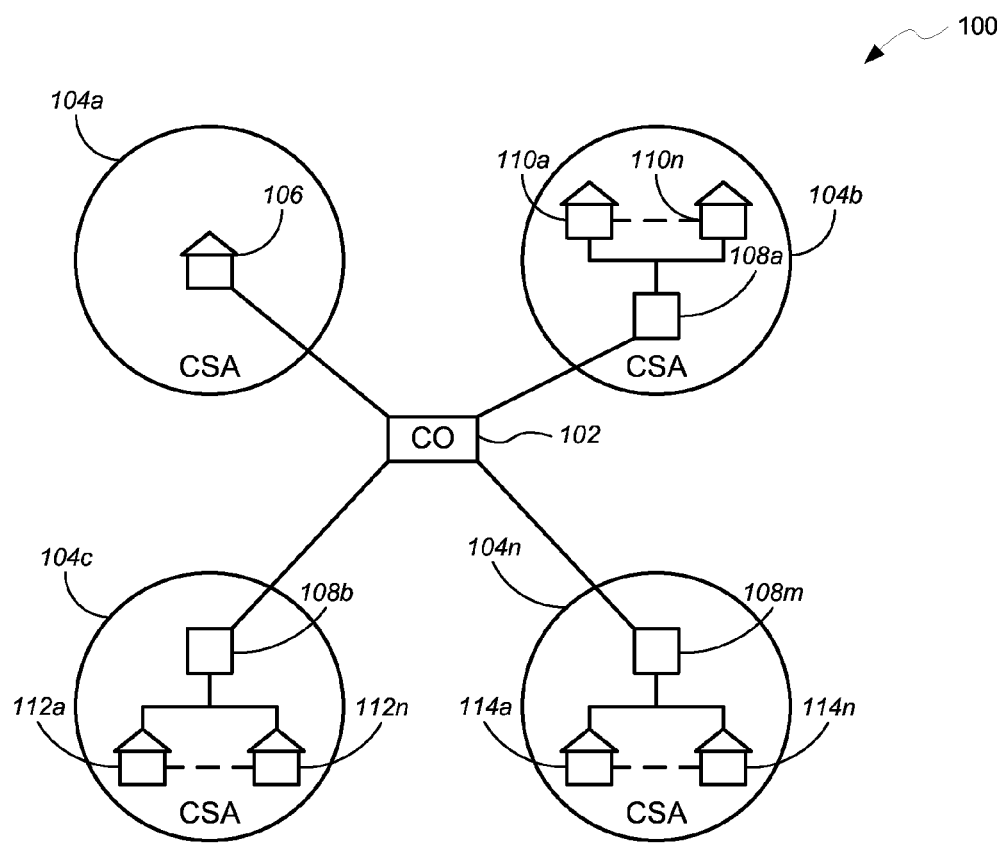
FIG. 1A is an illustration of an exemplary embodiment of a telecommunications service provider network coverage area that includes a central office that operates to provide telecommunications services to customers.
Figure 1B:
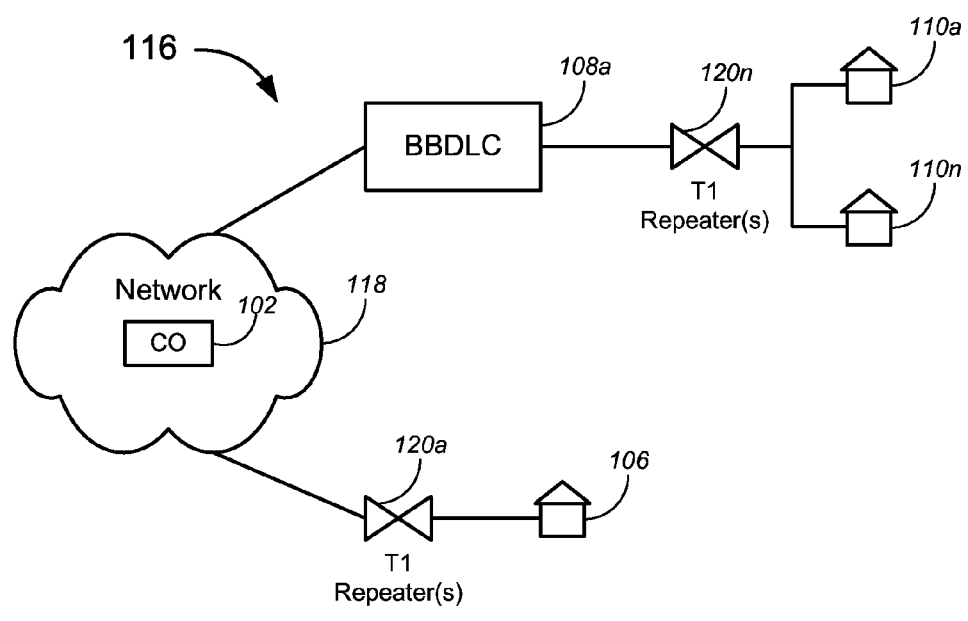
FIG. 1B is an illustration of an exemplary network configuration showing the two configurations of communications between a central office of a telecommunications service provider and residences of customers.
Figure 1C:
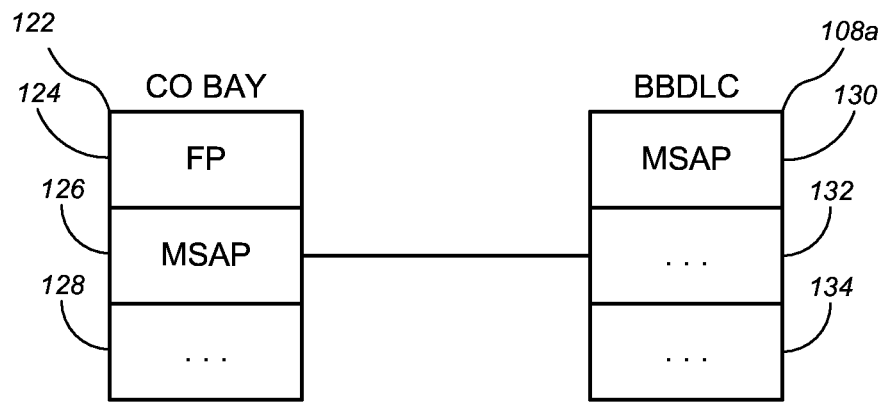
FIG. 1C is a block diagram of exemplary hardware within a central office bay of a central office and broadband digital loop carrier.
Figure 1D:
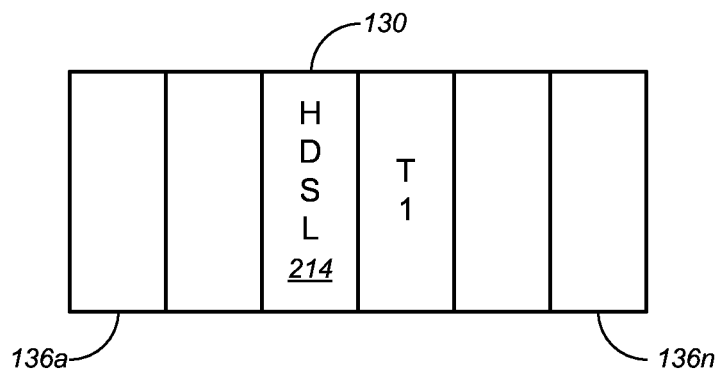
FIG. 1D is an illustration of an expanded view of a multi-service access platform unit.
Figure 2A:
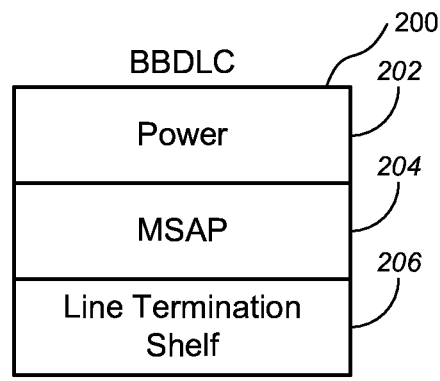
FIG. 2A is an illustration of an exemplary broadband digital loop carrier including a multi-service access platform unit and line termination unit.

Referring to FIG. 2A, a broadband digital loop carrier may include power 202, a multi-service access platform unit 204, and line termination unit 206. In one embodiment, the multi-service access platform unit 204 is a Calix device, such as a Calix C7 device, that is configured to provide a backplane that can handle high-bandwidth communications, such as 30 GB or higher. The backplane of the multi-service access platform 204 may have slots, where each slot is configured with high-bandwidth capabilities, such as 10 GB communications.

The line termination unit 206 may be a multiplexer module, such as a multiplexer module produced by AdTran, Inc. In one embodiment, the multiplexer is an AdTran Total Access 3000 (TA 3000) multiplexer module that may communicate with the multi-service access platform unit 204. The line termination unit 206, in essence, provides for T1 and HDSL devices to be operated by the line termination unit 206 rather than the MSAP unit 204, thereby enabling each slot of the multi-service access platform unit 204 to support a high-bandwidth communications card, such as a router or switch. By maximizing bandwidth utilization of the MSAP unit 204, broadband digital loop carriers used to service a customer serving area may be minimized.

Figure 2B:
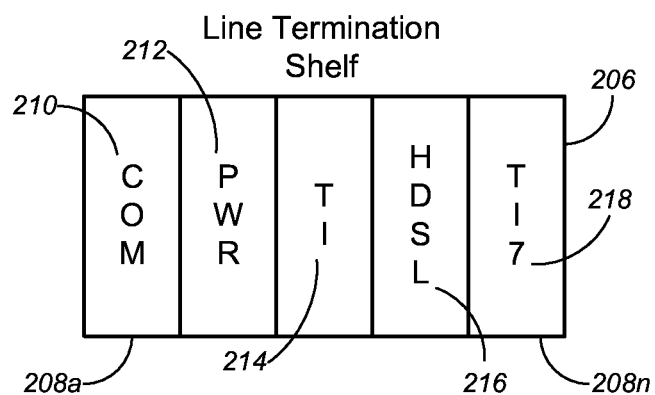
FIG. 2B is an illustration of an exemplary line termination unit.

Referring to FIG. 2B, the line termination unit 206 is shown to have multiple slots 208a-208n (collectively 208). In each of the slots 208, the same or different cards for providing functionality may be utilized. For example, a common card 210, power card 212, T1 card 214, HDSL card 216, and T/7 card 218 may be operated by the line termination unit 206. The configuration of the line termination unit 206, which may be a multiplexer, may enable the multi-service access platform unit 204 in the broadband digital loop carrier 200 (FIG. 2A) to operate at maximum bandwidth. The reason for the broadband digital loop carrier to be able to operate at the maximum bandwidth, or at least half of the maximum bandwidth, is that the T1 and HDSL cards, which have significantly lower bandwidth than the slots of the multi-service access platform unit 204 can support, may be moved from the multi-service access platform unit 204 to the line termination unit 206. In other words, because the T1 card 214 and HDSL card 216 operate at bandwidths that are significantly lower than the high-bandwidth of the multi-service access platform unit 204 (i.e., 9 MB and 18 MB versus 10 GB of each slot of the backplane of the MSAP unit 204), the multi-service access platform unit 204 is able to utilize cards that operate at high-bandwidth, thereby providing efficient use of the bandwidth of the multi-service access platform unit 204.

Figure 3:
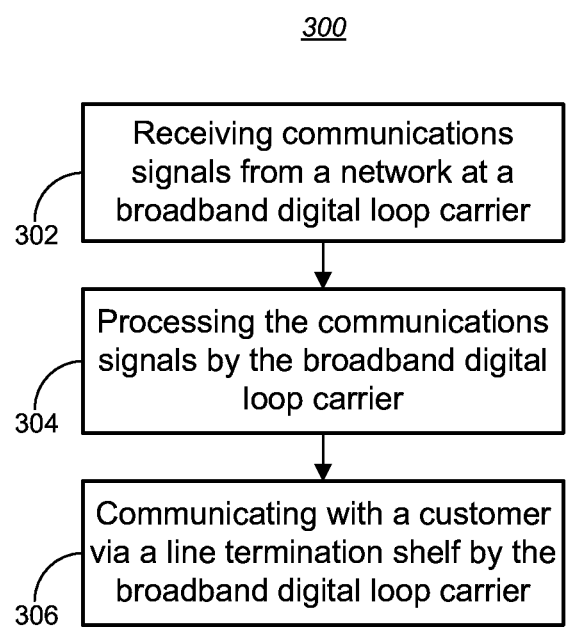
FIG. 3 is a flow diagram of an exemplary process for operation of a broadband digital loop carrier.

Regarding FIG. 3, a process 300 may include receiving communications signals from a network at a broadband digital loop carrier at step 302. The broadband digital loop carrier may be positioned within a customer serving area for serving customers of a telecommunications carrier within a geographical region. At step 304, the communications signals may be processed by the broadband digital loop carrier. In one embodiment, the communications signals may be processed by a multi-service access platform and electronics positioned in a backplane thereof. In one embodiment, the multi-service access platform unit may be a Calix C7 cabinet. At step 306, the broadband digital loop carrier may communicate with a customer via a line termination unit. For example, the line termination shelf may be an AdTran product, such as a Total Access 3000. The line termination shelf may include T1 and HDSL cards that are configured to communicate with customers in residences and commercial establishments. By utilizing a line termination unit, the multi-service access platform may utilize cards in slots of a backplane that perform at high-bandwidth, thereby being efficient in bandwidth capacity utilization. In other words, a slot of the MSAP that is capable of operating at a bandwidth of 10 GB may be utilized by an electronics card that operates at or near the bandwidth of the slot rather than a communications card, such as a T1 or HDSL card, that operates at significantly lower bandwidths. The cards operating in the slots of the MSAP unit may operate at a bandwidth of 50 percent (e.g., 5 GB) or higher of the operating bandwidth of a slot, which is significantly higher than low-bandwidth cards (e.g., 9 MB).

Figure 4:
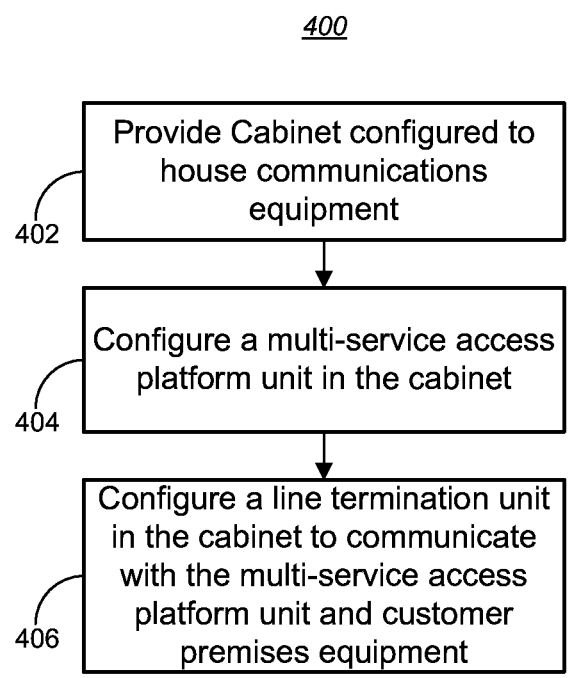
FIG. 4 is a flow diagram of an exemplary process for configuring a broadband digital loop carrier.

FIG. 4 is a flow diagram of an exemplary process 400 for configuring a broadband digital loop carrier. The process 400 starts at step 402, where a cabinet configured to house communications equipment is provided. The cabinet may be any cabinet configuration, as understood in the art. At step 404, a multi-service access platform unit may be configured in the cabinet. The multi-service access platform unit may include a backplane that is configured to enable communications and processing cards to be operated. At step 406, a line termination unit may be configured in the cabinet to communicate with the multi-service access platform unit and customer premises equipment. The line termination unit may be configured with communications equipment, such as cards, that operate a lower rates (i.e., having lower bandwidth) than equipment configured in the multi-service access platform to enable the multi-service access platform unit to utilize maximum bandwidth (e.g., 50% or higher). By utilizing maximum bandwidth of the multi-service access platform unit, a minimum number of broadband digital loop carriers may be used to provide communications services to a customer serving area.

Although particular embodiments of the present invention have been explained in detail, it should be understood that various changes, substitutions, and alterations can be made to such embodiments without departing from the spirit and scope of the present invention as defined solely by the following claims.

What is claimed:

1. A broadband digital loop carrier (BBDLC) for distributing communications signals to customers of a service provider, said BBDLC comprising:
   a multi-service access platform unit including a backplane having slots for electronic cards, wherein the multi-service access platform unit is configured to operate with only high-bandwidth communications cards; and
   a line termination unit in communication with the multi-service access platform unit, the line termination unit having slots configured to operate with only low-bandwidth communications cards, the low-bandwidth cards in the line termination unit operating at a lower bandwidth than the high-bandwidth communications cards in the multi-service access platform unit, the line termination unit operable to multiplex communications received from the low-bandwidth communications cards and communicate the multiplexed communications to the multi-service access platform unit, wherein the configuration of the slots to operate with the low-bandwidth and high-bandwidth communications cards allows the multi-service access platform unit to increase utilization of the bandwidth available to the multi-service access platform unit.

2. The BBDLC according to claim 1, wherein said multi-service access platform unit is a Calix multi-service access platform unit.

3. The BBDLC according to claim 2, wherein the Calix multi-service access platform unit is a Calix C7 multi-service access platform unit.

4. The BBDLC according to claim 1, wherein a line termination unit is an AdTran line termination unit.

5. The BBDLC according to claim 4, wherein the AdTran line termination unit is an AdTran TA 3000.

6. The BBDLC according to claim 1, wherein the line termination unit is a multiplexer.

7. The BBDLC according to claim 1, wherein each said high-bandwidth communications card is configured to operate at a bandwidth at least 50% of the available bandwidth of the slot.

8. The BBDLC according to claim 1, wherein said line termination unit includes T1 and HDSL cards.

9. A method for providing communications to customers of a communications service provider, said method comprising:
   receiving communications signals from a network at a broadband digital loop carrier that includes a multi-service access platform unit that operates with only high-bandwidth communications cards;
   processing the communications signals by the broadband digital loop carrier; and
   communicating the communications signals with a customer via a line termination unit by the broadband digital loop carrier, wherein the line termination unit uses only low-bandwidth communications cards, the low-bandwidth communications cards in the line termination unit operating at a lower bandwidth than the high-bandwidth communications cards in the multi-service access platform unit, the line termination unit operable to multiplex communications received from the low-bandwidth communications cards and communicate the multiplexed communications to the broadband digital loop carrier, wherein the configuration of the slots to operate with the communication cards allows the broadband digital loop carrier to increase utilization of the bandwidth available to the broadband digital loop carrier.

10. The method according to claim 9, wherein receiving communications signals from a network includes receiving communications signals from the public switched telephone network (PSTN).

11. The method according to claim 9, wherein processing includes routing the communications signals.

12. The method according to claim 9, wherein operating the multi-service access platform unit includes operating a Calix multi-service access platform unit.

13. The method according to claim 9, wherein communicating via a line termination unit includes communicating via an AdTran line termination unit.

14. The method according to claim 9, wherein communicating via a line termination unit includes communicating via at least one of a T1 card and HDSL card in the line termination unit.

15. A method of configuring a broadband digital loop carrier, said method comprising:
   providing a cabinet configured to house communications equipment;
   configuring a multi-service access platform unit in the cabinet, the multi-service access platform including a backplane having slots for electronic cards, wherein the slots are configured to operate with only high-bandwidth communications cards; and
   configuring a line termination unit in the cabinet, the line termination unit being in communication with customer premises equipment and the multi-service access platform unit, the line termination unit having slots configured to operate with only low-bandwidth communications cards, the low-bandwidth cards in the line termination unit operating at a lower bandwidth than the high-bandwidth communications cards in the multi-service access platform unit, the line termination unit operable to multiplex communications received from the low-bandwidth communications cards and communicate the multiplexed communications to the multi-service access platform wherein the configuration of the slots to operate with the communications cards allows the multi-service access platform to increase utilization of the bandwidth available to the BBDLC.

16. The method according to claim 15, further comprising configuring a card within each slot of the multi-service access platform unit that utilizes at least 50% of available bandwidth of a respective slot.

17. The method according to claim 15, wherein configuring a multi-service access platform unit includes configuring a Calix multi-service access platform unit.

18. The method according to claim 15, wherein configuring the line termination unit includes configuring an AdTran line termination unit.

19. The method according to claim 15, further comprising positioning the cabinet in a customer serving area of a communications service provider.

* * * * *